United States Patent [19]

Donaldson

[11] Patent Number: 5,045,274
[45] Date of Patent: Sep. 3, 1991

[54] WATER COOLED NUCLEAR REACTORS

[75] Inventor: Anthony J. Donaldson, Nottingham, England

[73] Assignee: Rolls-Royce and Associates limited, Derby, England

[21] Appl. No.: 364,164

[22] Filed: Jun. 12, 1989

[30] Foreign Application Priority Data

Jun. 13, 1988 [GB] United Kingdom ............... 8813916

[51] Int. Cl.$^5$ .......................................... G21C 23/00
[52] U.S. Cl. .................... 376/318; 376/317; 376/282; 376/298; 376/299; 376/406
[58] Field of Search ............. 376/282, 317, 318, 298, 376/299, 406

[56] References Cited

U.S. PATENT DOCUMENTS

| | | | |
|---|---|---|---|
| 3,578,564 | 5/1971 | Fletcher, III | 176/87 |
| 4,526,742 | 7/1985 | Hannerz | 376/282 |
| 4,576,782 | 3/1986 | Loose | 376/282 |
| 4,587,079 | 5/1986 | Fajeau et al. | 376/282 |
| 4,696,791 | 9/1987 | Straub | 376/299 |
| 4,702,879 | 10/1987 | Tower et al. | 376/282 |
| 4,759,899 | 7/1988 | Koutz et al. | 376/298 |
| 4,793,964 | 12/1988 | Fajeau | 376/294 |

FOREIGN PATENT DOCUMENTS

1051136 9/1963 United Kingdom .
1007207 9/1964 United Kingdom .
1105559 7/1965 United Kingdom .
1252943 11/1968 United Kingdom .
1247897 12/1968 United Kingdom .

Primary Examiner—Robert L. Stoll
Assistant Examiner—N. Bhat
Attorney, Agent, or Firm—Cushman, Darby & Cushman

[57] ABSTRACT

In order to reduce any loss of primary water coolant from around a reactor core of a water cooled nuclear reactor caused by any failure of a pressure vessel, an inner vessel is positioned within and spaced from the pressure vessel. The reactor core and main portion of the primary water coolant circuit and a heat exchanger are positioned within the inner vessel to maintain some primary water coolant around the reactorcore and to allow residual decay heat to be removed from the reactor core by the heat exchanger. In a second embodiment an aperture at the upper region of the inner vessel is dimensioned configured and arranged to prevent steam from a steam space of an integral pressurized water cooled nuclear reactor for a ship entering the main portion of the primary water coolant circuit in the inner vessel if the longitudinal axis of the nuclear reactor is displaced from its normal substantially vertical position to an abnormal position at an angle to the vertical direction.

9 Claims, 5 Drawing Sheets

WATER COOLED NUCLEAR REACTORS

BACKGROUND OF THE INVENTION

The present invention relates to water cooled nuclear reactors which operate in a pressurized condition. The present invention is applicable to pressurized water reactors (PWR) and to boiling water reactors (BWR) of either direct or indirect cycle types. The pressurizer may be integral with, or separate from, the pressure vessel of the reactor.

A problem with these types of water cooled nuclear reactors is that there are accident conditions, or failures of the pressure vessel, which result in a loss of primary water coolant from the primary water coolant circuit causing the reactor core to become uncovered and uncooled.

A further problem with these types of water cooled nuclear reactors especially for use in marine applications when installed in, and used to propel and/or to provide power for, a ship is that violent motions of the ship through the water can cause the reactor core to become uncovered and uncooled.

SUMMARY OF THE INVENTION

The present invention seeks to provide a water cooled nuclear reactor in which the reactor core remains covered with and cooled by primary water coolant in the event of accident conditions or a failure of the pressure vessel.

The present invention also seeks to provide a water cooled nuclear reactor in which the core remains covered with and cooled by primary water coolant, in the event there are violent motions of a ship in which the water cooled nuclear reactor is installed.

Accordingly the present invention provides a water cooled nuclear reactor comprising a pressure vessel, a reactor core, a primary water coolant circuit, a pressurizer and an inner vessel, the inner vessel being positioned within and spaced from the pressure vessel, the reactor core and a main portion of the primary water coolant circuit being positioned within the inner vessel, a portion of the primary water coolant circuit being positioned in the space between the pressure vessel and the inner vessel, the inner vessel having at least one aperture at an upper region thereof to interconnect the main portion of the primary water coolant circuit within the inner vessel with the portion of the primary water coolant circuit between the pressure vessel and the inner vessel above the inner vessel to allow a flow of primary water coolant or steam therebetween, the inner vessel being arranged to at least reduce any loss of primary water coolant from around the reactor core caused by any failure of the pressure vessel.

The at least one aperture in the inner vessel may be dimensioned, arranged and configured to prevent steam from a steam space of the pressurizer entering the main portion of the primary water coolant circuit in the inner vessel if in operation the longitudinal axis of the water cooled nuclear reactor is displaced from a normal position in which the longitudinal axis of the water cooled nuclear reactor is substantially vertical and the aperture in the inner vessel is at an upper region of the inner vessel to an abnormal position in which the longitudinal axis of the water cooled nuclear reactor is disposed at an angle with respect to the vertical direction or to an abnormal position in which the longitudinal axis of the water cooled nuclear reactor is substantially vertical but the aperture in the inner vessel is at a lower region of the inner vessel.

The inner vessel may be arranged coaxially with the pressure vessel and the aperture in the inner vessel is arranged coaxially with the axis of the water cooled nuclear reactor.

At least one heat exchanger may be positioned within the inner vessel.

The water cooled nuclear reactor may be an integral pressurized water cooled nuclear reactor.

The water cooled nuclear reactor may be a pressurized water cooled nuclear reactor or a boiling water cooled nuclear reactor.

The pressurizer may be separate from or integral with the pressure vessel.

The present invention also provides an integral pressurized water cooled nuclear reactor comprising a pressure vessel, a reactor core, a primary water coolant circuit, a pressurizer and an inner vessel, the inner vessel being positioned within and spaced from the pressure vessel, the reactor core and a main portion of the primary water coolant circuit being positioned within the inner vessel, a portion of the primary water coolant circuit and a steam space of the pressurizer being positioned in the space between the pressure vessel and the inner vessel, the inner vessel having at least one aperture at an upper region thereof to interconnect the main portion of the primary water coolant circuit within the inner vessel with the portion of the primary water coolant circuit and the steam space between the pressure vessel and the inner vessel above the inner vessel to allow a flow of primary coolant or steam therebetween, the at least one aperture in the inner vessel being dimensioned, arranged and configured to prevent steam from the steam space of the pressurizer entering the main portion of the primary water coolant circuit in the inner vessel if in operation the longitudinal axis of the integral pressurized water cooled nuclear reactor is displaced from a normal position in which the longitudinal axis of the integral pressurized water cooled nuclear reactor is substantially vertical and the aperture in the inner vessel is at an upper region of the inner vessel to an abnormal position in which the longitundinal axis of the integral pressurized water cooled nuclear reactor is disposed at an angle with respect to the vertical direction or to an abnormal position in which the longitudinal axis of the integral pressurized water cooled nuclear reactor is substantially vertical but the aperture in the inner vessel is at a lower region of the inner vessel whereby the inner vessel maintains primary water coolant around the reactor core.

The inner vessel may be arranged coaxially with the pressure vessel and the aperture in the inner vessel is arranged coaxially with the longitudinal axis of the integral pressurized water cooled nuclear reactor.

At least one heat exchanger may be positioned within the inner vessel.

BRIEF DESCRIPTION OF THE DRAWINGS

The present invention will be more fully described by way of example with reference to the accompanying drawings, in which.

DETAILED DESCRIPTION OF THE INVENTION

Figure 1:
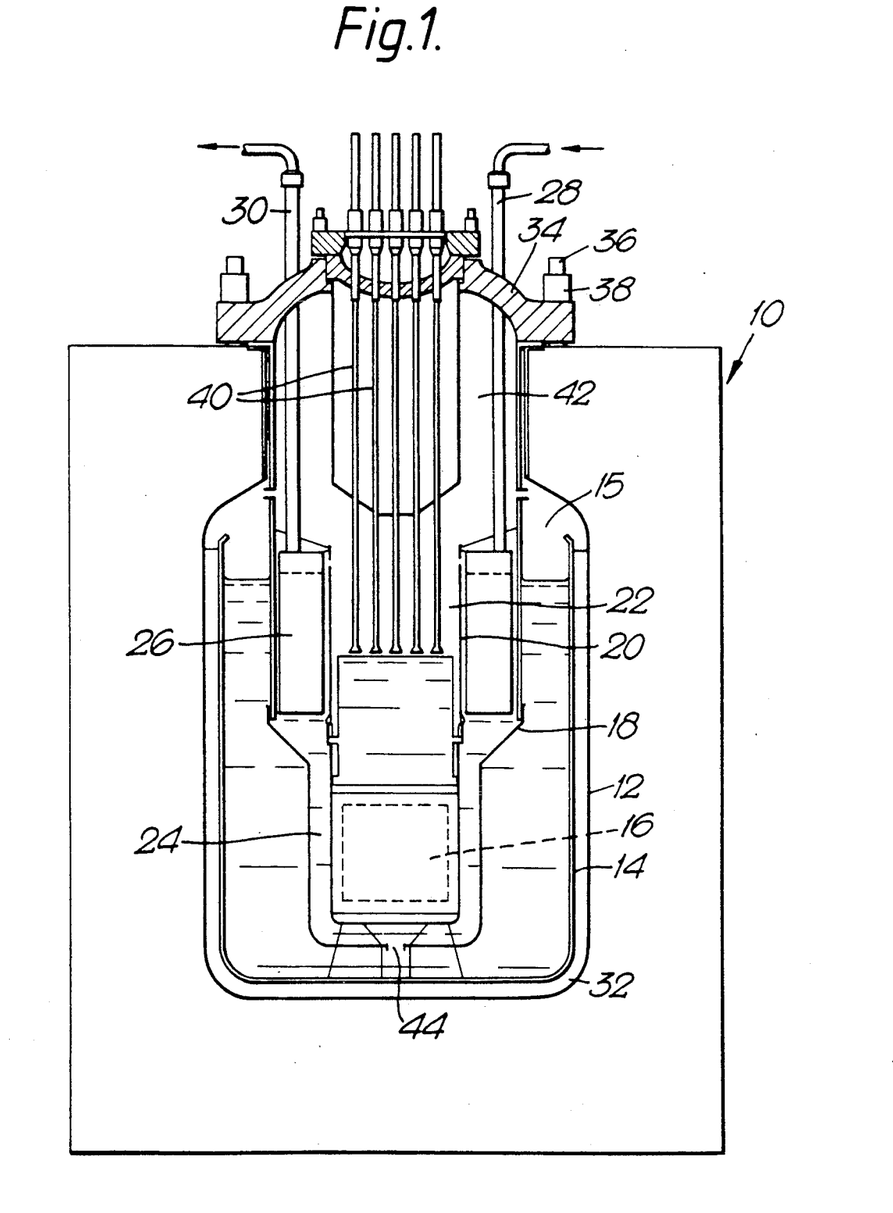
FIG. 1 is a vertical cross-sectional diagrammatical view of an integral indirect cycle boiling water reactor according to the present invention.

An integral indirect cycle boiling water nuclear reactor (BWR) 10 is shown in FIG. 1, and this embodiment is suitable for use as a land based pressurized indirect cycle boiling water nuclear reactor. The indirect cycle boiling water reactor 10 comprises a pressure vessel 12 and an inner vessel 14 positioned within and spaced from the pressure vessel 12 to define a space 32. The inner vessel 14 is supported from the pressure vessel 12. A reactor core 16 is positioned within the inner vessel 14 at a lower region thereof. The reactor core 16 is surrounded by thermal shields (not shown) to protect the inner vessel 14 and pressure vessel 12 from radiation emanating from the reactor core 16. The reactor core 16 includes a system of movable neutron absorbing control rods (not shown) linked to drive mechanisms (not shown) by drive rods 40.

A primary water coolant circuit is used to cool the reactor core 16, and the primary water coolant circuit uses a natural circulating arrangement or a pumped flow. The primary water coolant circuit comprises an outer hollow generally cylindrical member 18 which surrounds the reactor core 16 and an inner hollow cylindrical member 20 positioned coaxially within the outer hollow cylindrical member 28 and vertically above the reactor core 16. The inner hollow cylindrical member 20 defines a riser passage 22 therein for the natural vertically upward flow of relatively hot primary coolant from the reactor core 16, and an annular downcomer passage 24 is defined between the inner hollow cylindrical member 20 and the outer hollow cylindrical member 18 for the natural vertically downward return flow of relatively cool primary coolant to the reactor core 16.

The upper region of the inner cylindrical member 20 is provided with apertures for the distribution of flow of the primary water coolant from the riser passage 22 to the upper part of the annular downcomer passage 24.

A secondary coolant circuit takes heat from the primary water coolant circuit. The secondary coolant circuit comprises a heat exchanger 26 which is annular and is positioned coaxially in the upper region of the annular downcomer passage 24. The heat exchanger 26 comprises one or more tubes which are arranged in an annulus, which receive secondary coolant from a supply of secondary coolant via a supply pipe 28 and inlet header (not shown), and which supply heated secondary coolant via an outlet header (not shown) and a supply pipe 30 for driving an electrical turbo-generator, for district heating or process heat.

The heat exchanger 26 in this example is a steam generator, and the secondary coolant used is water. The steam generator could be a once through type or a recirculatory type with downcomer pipes between the outlet and inlet headers.

The upper end of the pressure vessel 12 is sealed by a lid 34 which is secured to the pressure vessel 12 by bolts 36 and nuts 38.

The inner vessel 14 has at least one aperture 15 at an upper region which allows steam to flow freely from the main portion of the primary water coolant circuit within the inner vessel 14 to a pressurizer steam space 42 i.e. a portion of the primary water coolant circuit between the pressure vessel 12 and the inner vessel 14 above the inner vessel 14. The apertures 15 in some arrangements of indirect cycle boiling water reactors may be provided with means to control the water level within the inner vessel 14 by regulating the flow of steam from the inner vessel 14 to the pressure vessel 12.

The inner vessel 14 is spaced from the outer hollow cylindrical member 18 and a large volume of reserve primary water coolant is contained therebetween. The outer hollow cylindrical member 18 has an aperture 44 at its lower region to interconnect the reserve primary water coolant and the lower region of the annular downcomer 24.

The steam space 42 pressurizes the primary water coolant circuit.

In normal operation of the indirect cycle boiling water nuclear reactor 10 the fission of nuclear fuel in the reactor core 16 produces heat. The heat is carried away from the reactor core 16 by the primary water coolant circuit. The heating of the water in the vicinity of the reactor core 16 causes the water to flow in an upwards direction through the riser passage 22, the primary water then flows through the flow distribution apertures in the inner hollow cylindrical member 20 into the annular downcomer passage 24 and passes over the steam generator 26. The primary water gives heat to the secondary water in the steam tubes on passing over the steam generator 26. The primary water returns to the reactor core 16 through the annular downcomer passage 24.

In the event of a breach or break, of the pressure vessel in conventional water cooled reactors the primary water coolant leaks out of the pressure vessel resulting in a fall of water level in the primary water coolant circuit, which leads to the reactor core eventually becoming uncovered by water and uncooled by water. Such an event is undesirable because although the operation of the water cooled reactor can be closed down by the insertion of the neutron absorbing control rods into the reactor core, there is still a considerable amount of decay heat remaining in the reactor core which can cause the reactor core to be damaged if the reactor core is not cooled.

The provision of the inner vessel 14 reduces or prevents the loss of primary water coolant from the region of the primary water coolant circuit surrounding the reactor core 16 and the heat exchanger 26 in the event of the pressure vessel 12 being breached in the nuclear reactor 10 of the present invention. The heat exchanger 26 removes fission product heat from the primary water coolant in the primary water coolant circuit and the reserve of primary water coolant retained by the inner vessel 14 within the depressurized nuclear reactor.

If the water level in the primary water coolant circuit falls to a level below the level of the heat exchanger 26 condensation on the said heat exchanger 26 will return primary water coolant to the region of the primary water coolant circuit surrounding the reactor core 16.

Even in the event of a malfunction of the heat exchanger 26 a measure of protection against reactor core damage 16 is provided by retaining primary water coolant in the region of the primary water coolant circuit surrounding the reactor core, this primary water coolant will continue to cool the reactor core 16 by boiling away until the water level in the primary water coolant circuit falls below the top of the reactor core 16.

The invention may equally well be applied to an integral self pressurized water cooled nuclear reactor (PWR) suitable for use as a land based PWR and may be substantially as shown in FIG. 1.

An integral self pressurized water cooled nuclear reactor (PWR) 10B is shown in FIGS. 2 to 5, and this embodiment is suitable for use as a ship based pressurized water nuclear reactor. The integral pressurized water cooled nuclear reactor 10B comprises a pressure vessel 12 and an inner vessel 14 positioned within and spaced from the pressure vessel 12 to define a space 32. The inner vessel 14 is supported from the pressure vessel 12. A reactor core 16 is positioned within the inner vessel 14 at a lower region thereof. The reactor core 16 is surrounded by thermal shields 52 to protect the inner vessel 14 and pressure vessel 12 from radiation emanating from the reactor core 16 and these are formed integral with the inner vessel 14. The reactor core 16 includes a system of moveable neutron absorbing control rods (not shown) linked to drive mechanisms (not shown) by drive rods 40.

Figure 2:
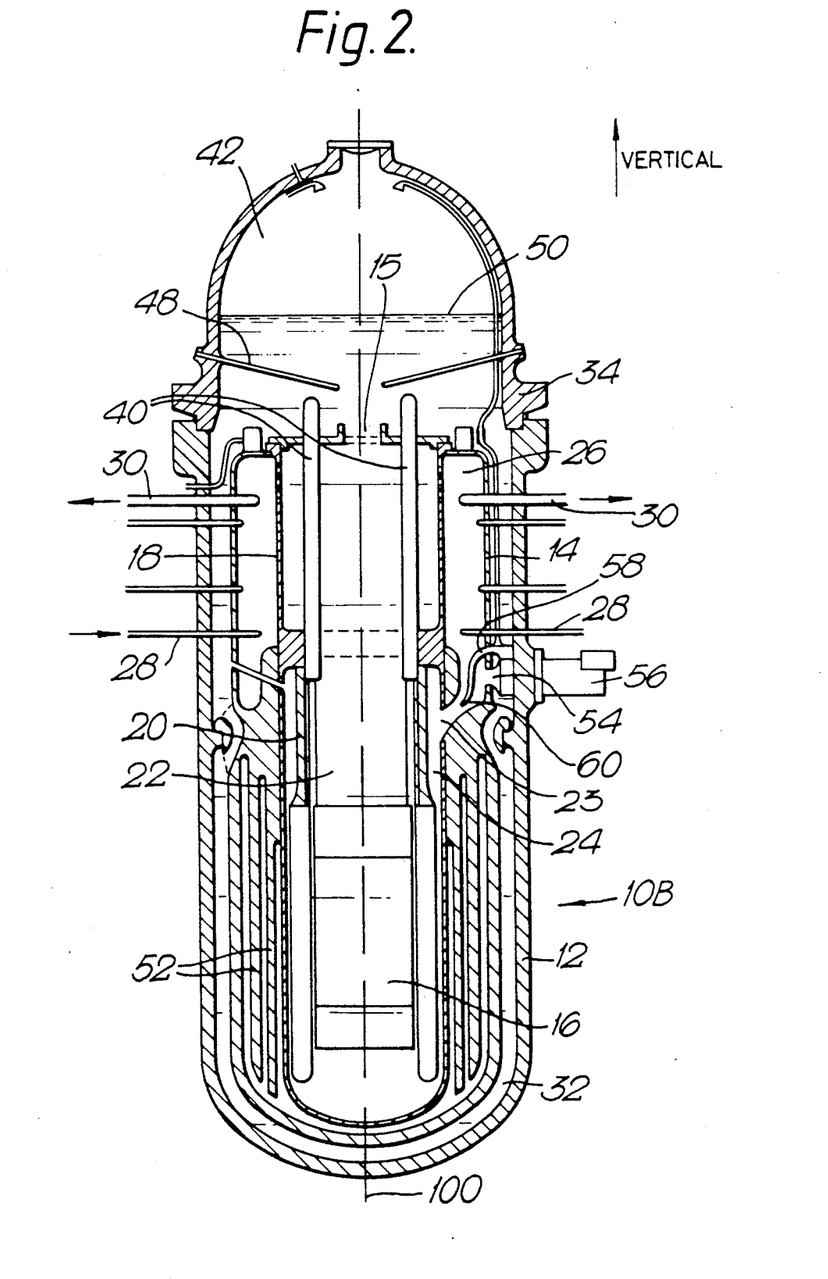
FIGS. 2 to 5 are vertical cross-sectional diagrammatical views of an integral pressurized water reactor suitable for use in a ship under various operating conditions.

A primary water coolant circuit is used to cool the reactor core 16, and the primary water coolant circuit uses a natural circulating arrangement or a pumped flow. The primary water coolant circuit comprises an outer hollow generally cylindrical member 18 which surrounds the reactor core 16 and an inner hollow cylindrical member 20 positioned coaxially within the outer hollow cylindrical member 18 and vertically above the reactor core 16. The inner hollow cylindrical member 20 extends vertically upwards to a mid region of the outer hollow cylindrical member 18, and the upper end of the inner hollow cylindrical member 20 seals and is secured to the mid region of the outer hollow cylindrical member 18. The inner hollow cylindrical member 20 and the upper region of the outer hollow cylindrical member 18 define a riser passage 22 therein for the natural vertically upward flow of relatively hot primary coolant from the reactor core 16, and an upper portion of an annular downcomer passage 24 is defined between the upper region of the outer hollow cylindrical member 18 and the inner vessel 14 and a lower portion of the annular downcomer passage 24 is defined between the lower region of the outer hollow cylindrical member 18 and the inner hollow cylindrical member 20 for the natural vertically downward return flow of relatively cool primary coolant to the reactor core 16. The outer cylindrical member 18 has one or more apertures 23 therethrough to interconnect the upper portion and the lower portion of the annular downcomer passage 24.

The upper region of the outer cylindrical member 18 is provided with apertures 21 for the distribution of flow of the primary water coolant from the riser passage 22 to the upper portion of the annular downcomer passage 24.

A secondary coolant circuit takes heat from the primary water coolant circuit. The secondary coolant circuit comprises a heat exchanger 26 which is annular and is positioned coaxially in the upper region of the annular downcomer passage 24. The heat exchanger 26 comprises one or more tubes which are arranged in an annulus which receive secondary coolant from a supply of secondary coolant via at least one supply pipe 28 and at least one inlet header (not shown), and which supply heated secondary coolant via at least one outlet header (not shown) and at least one supply pipe 30 for driving an electrical turbo-generator or a propulsion system.

The heat exchanger 26 is a steam generator and the secondary coolant used is water. The upper end of the pressure vessel 12 is sealed with a lid 34 which is secured to the pressure vessel 12 by suitable means.

The inner vessel 14 has an aperture 15 at its upper region to allow steam to flow freely from the main portion of the primary water coolant circuit within the inner vessel 14 to a pressurized steam space 42 i.e. a portion of the primary water coolant circuit between the pressure vessel 12 and the inner vessel 14, above the inner vessel 14. The water level of the primary water coolant circuit is above the inner vessel 14, and the space 32 between the inner vessel 14 and the pressure vessel 12 is filled with primary water coolant. The aperture 15 also allows the flow of primary water coolant therethrough for changes in primary water coolant volume.

One or more pumps are provided to promote the circulation of the primary water coolant in the primary water coolant circuit. A pump is positioned in the annular downcomer passage 24, and in this example the inner vessel 14 has an aperture 54 for the flow of primary water coolant into a centrifugal pump 56. The centrifugal pump 56 accelerates the primary water coolant flowing through the pump up to a high speed and then directs the primary water coolant through a pipe 58 to a nozzle 60. The nozzle 60 is positioned coaxially in one of the apertures 23 in the inner cylindrical member 20 to induce a larger flow of primary water coolant through the primary water coolant circuit by the ejector, or jet pump, effect.

The steam space 42 pressurizes the primary water coolant circuit.

In normal operation of the integral pressurized water nuclear reactor 10B the fission of the nuclear fuel in the reactor core 16 produces heat. The heat is carried away from the reactor core 16 by the primary water coolant circuit. The primary water coolant in the primary water circuit gives heat to the secondary water in the steam tubes on passing over the steam generator 26.

The provision of the inner vessel 14 reduces or prevents the loss of primary water coolant from the region of the primary water coolant circuit surrounding the reactor core 16 and the heat exchanger 26 in the event of the pressure vessel 12 being breached in the nuclear reactor 10B of the present invention, although any primary water coolant in the space 32 between the pressure vessel 12 and the inner vessel 14 will escape from the pressure vessel 12 but the embodiment in FIG. 2 will function in substantially the same way as the embodiment in FIG. 1.

In conventional integral pressurized water reactors in which the heat exchanger and the pressurizer steam space are contained within the pressure vessel with the reactor core, and in which the integral pressurized water reactor is used in a ship, extreme heel and trim angles or conditions of violent motion of the sea or water through which the ship is moving or accident conditions result in a portion, or the whole, of the reactor core becoming uncovered by water and uncooled by water.

In FIG. 2 the pressure vessel 12 and the inner vessel 14 are generally cylindrical and are arranged coaxially. The nuclear reactor 10B has a longitudinal axis 100 which is coaxial with the axis of the pressure vessel 12 and the inner vessel 14. It should be noted that in normal operation the longitudinal axis 100 of the nuclear reactor 10B extends in a substantially vertical direction.

Figure 3:
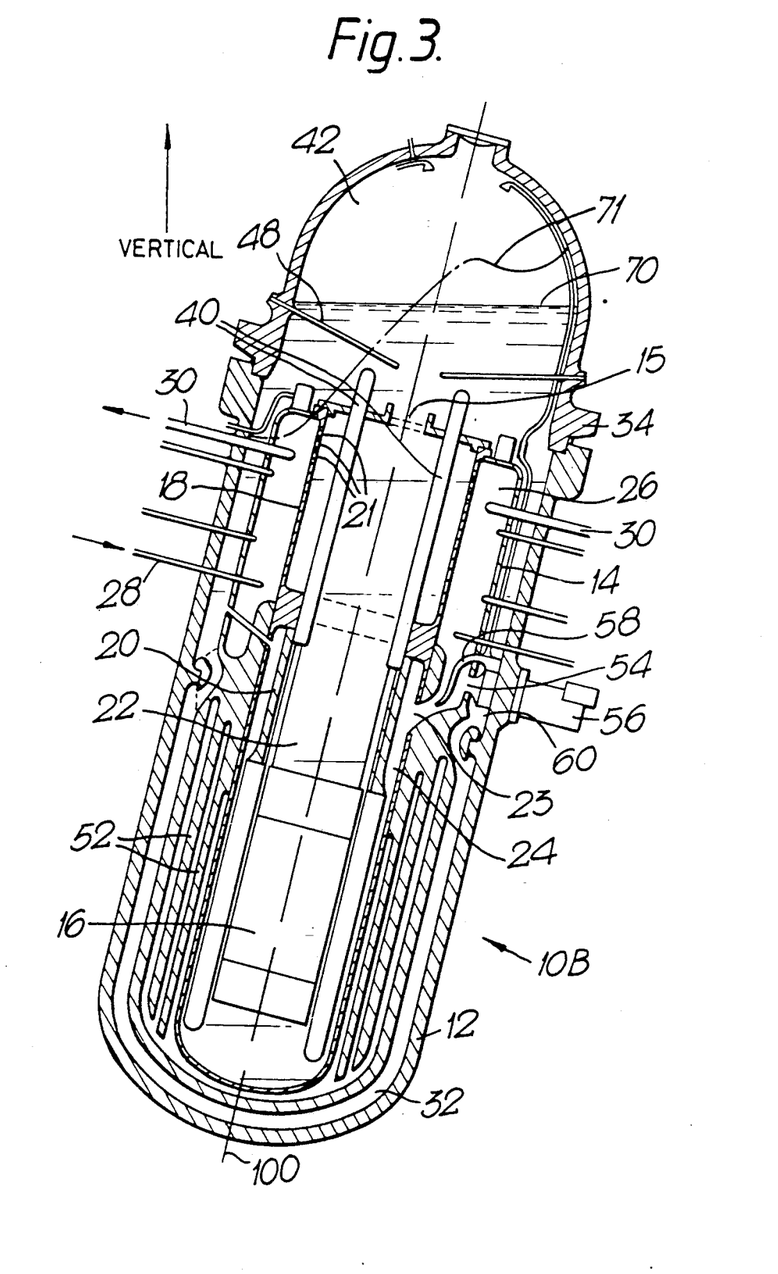
Figure 4:
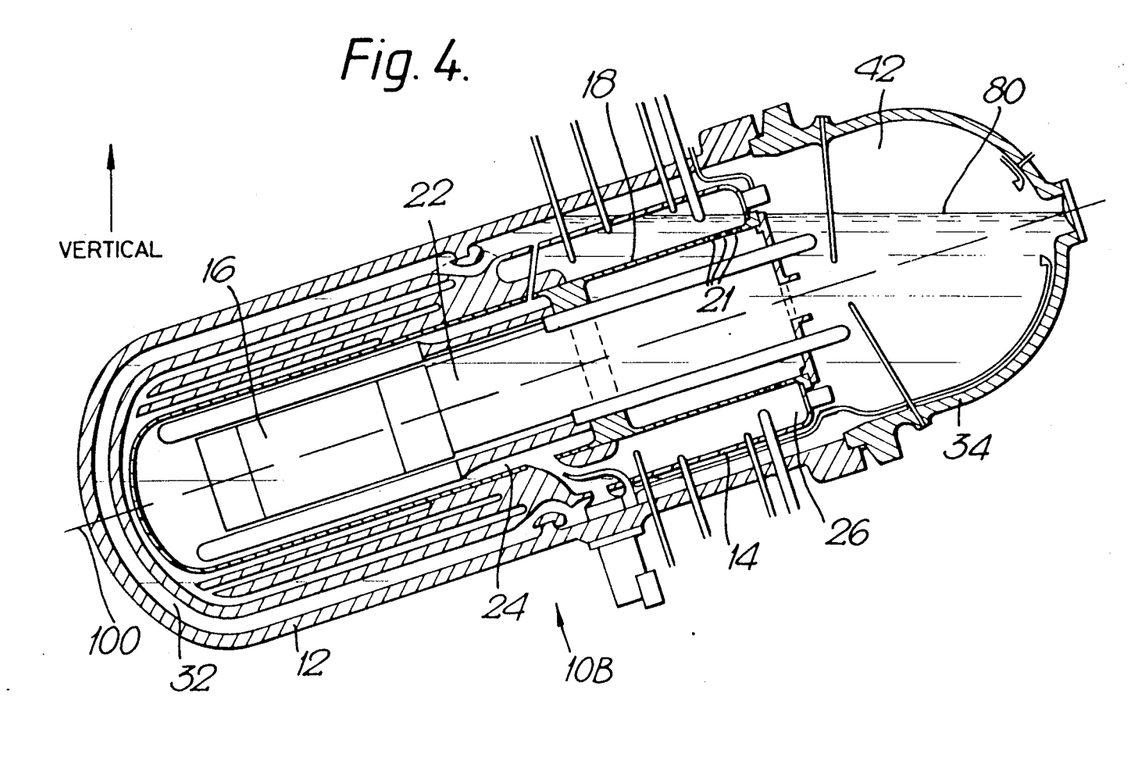
Figure 5:
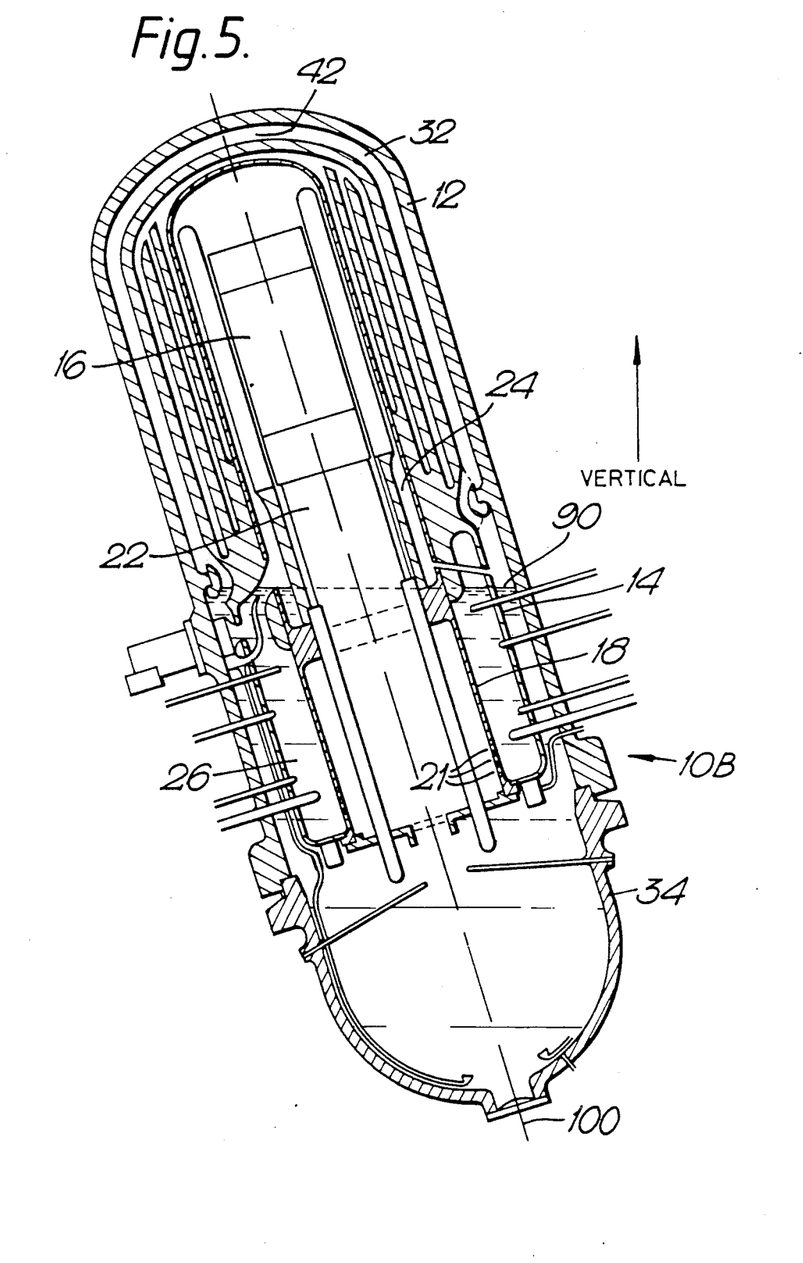

FIGS. 3 to 5 show the integral pressurized water reactor 10B in various normal and abnormal sea conditions and accident conditions.

In FIG. 3 the integral pressurized water reactor 10B is in normal operation but under violent sea motion, the longitudinal axis 100 of the nuclear reactor 10B has been displaced from the vertical direction and is angled with respect to the vertical direction. The mean water level of the primary water coolant circuit is denoted by 70, but there is a sloshing action of the primary water coolant giving an actual water level of 71 for example.

The aperture 15 in the inner vessel 14 is dimensioned, arranged and configured to prevent steam from the steam space 42 of the pressurizer entering the main portion of the primary water coolant circuit within the inner vessel 14 during the operation of the nuclear reactor 10B if the longitudinal axis 100 of the nuclear reactor 10B is displaced from its normal position in which the longitudinal axis 100 extends substantially vertical to an abnormal position in which the longitudinal axis 100 of the nuclear reactor 10B is angled with respect to the vertical direction. In particular the aperture 15 is positioned coaxially with the pressure vessel 12, inner vessel 14 and the longitudinal axis 100.

Although the longitudinal axis 100 of the nuclear reactor 10B has been displaced from its normal vertical position, in FIG. 3, the mean water level 70 of the primary water coolant circuit is above the aperture 15 in the inner vessel 14 and steam from the steam space 42 of the pressurizer cannot enter the main portion of the primary water coolant circuit within the inner vessel 14. The aperture 15 is positioned coaxially with the longitudinal axis 100, and is dimensioned so that any sloshing action of the primary water coolant does not cause the actual water level 71 at any instant to pass through the aperture 15 and does not cause steam to enter the inner vessel 14.

In FIG. 4 the integral pressurized water reactor 10B is in an abnormal position when the ship is laid over on beam ends, the longitudinal axis 100 of the nuclear reactor 10B has been displaced from the vertical direction and is at a much greater angle with respect to the vertical direction than in FIG. 3. The angle of displacement is of the order of 70° to 110° or approximately 90° with respect to the vertical direction. The mean water level of the primary water coolant circuit is denoted by 80.

Even though the longitudinal axis 100 of the nuclear reactor 10B has been displaced by a much larger angle from its normal position, in FIG. 4, the mean water level 80 of the primary water coolant circuit is above the aperture 15 in the inner vessel 14 and steam from the steam space 42 of the pressurizer cannot enter the main portion of the primary water coolant circuit within the inner vessel 14.

In FIG. 5 the integral pressurized water reactor is in an abnormal/accident condition when the ship has capsised or is approximately half way through a 360° roll, the longitudinal axis 100 of the nuclear reactor 10B has been displaced from the normal vertical direction and is at a very much greater angle with respect to the normal vertical direction. The angle of displacement is of the order of 160° to 200° or approximately 180°, with respect to the vertical direction, i.e. the nuclear reactor 10B is upside down. The mean water level of the primary water coolant circuit is denoted by 90 and this is formed between the inner vessel 14 and the pressure vessel 12, and the steam space 42 is positioned between the inner vessel 14 and the pressure vessel 12 in space 32.

Even though the longitudinal axis 100 of the nuclear reactor 10B has been displaced by approximately 180° to invert the nuclear reactor 10B, steam from the steam space 42 cannot enter the main portion of the primary water coolant circuit within the inner vessel 14.

Therefore it can be seen that the inner vessel 14 together with suitable dimensioning arranging and configuring of the aperture 15 can prevent steam from the steam space 42 of the pressurizer entering the main portion of the primary water coolant circuit within the inner vessel 14 and this maintains primary water coolant around the reactor core 16 even if the nuclear reactor 10B is inverted.

The nuclear reactor 10B is safeguarded in operation during violent sea conditions or when the stability of the ship is seriously impaired, by the inner vessel 14 and aperture 15, and continued operation of the nuclear reactor 10B is possible to provide power even if the ship and nuclear reactor 10B are upside down, subject to the functioning of other equipment on the ship.

The nuclear reactor 10B may equally well be used as a land based nuclear reactor and would function as the embodiment in FIG. 1.

I claim:

1. A pressurized water cooled nuclear reactor comprising a pressure vessel, a reactor core, a primary water coolant circuit, at least one heat exchanger, a pressurizer and an inner vessel, the inner vessel being positioned within and spaced from the pressure vessel, the primary water coolant circuit comprising a main portion and a second portion, the reactor core, the at least one heat exchanger and the main portion of the primary water coolant circuit being positioned within the inner vessel, the second portion of the primary water coolant circuit being positioned in the space between the pressure vessel and the inner vessel, the primary water coolant circuit being arranged to have a water level and a steam space positioned above the inner vessel, the inner vessel having a first region, the first region of the inner vessel having at least one aperture to interconnect the main portion of the primary water coolant circuit within the inner vessel with the second portion of the primary water coolant circuit between the pressure vessel and the inner vessel above the inner vessel to allow a flow of primary water coolant therebetween, and to prevent a flow of steam from the steam space to the main portion of the primary water coolant circuit.

2. A pressurized water cooled nuclear reactor as claimed in claim 1 wherein the at least one aperture in the inner vessel is dimensioned, arranged and configured to prevent steam from the steam space from entering the main portion of the primary water coolant circuit in the inner vessel if in operation the longitudinal axis of the pressurized water cooled nuclear reactor is displaced from a normal position in which the longitudinal axis of the pressurized water cooled nuclear reactor is substantially vertical and the aperture in the first region of the inner vessel is at an upper region of the inner vessel to an abnormal position in which the longitudinal axis of the pressurized water cooled nuclear reactor is disposed at an angle with respect to the vertical direction or to an abnormal position in which the longitudinal axis of the pressurized water cooled nuclear reactor is substantially vertical but the aperture in the first region of the inner vessel is at a lower region of the inner vessel.

3. A pressurized water cooled nuclear reactor as claimed in claim 2 wherein the inner vessel is arranged coaxially with the pressure vessel and the aperture in the inner vessel is arranged coaxially with the longitudinal axis of the pressurized water cooled nuclear reactor.

4. A pressurized water cooled nuclear reactor as claimed in claim 1 wherein the pressurized water cooled nuclear reactor is an integral self pressurized water cooled nuclear reactor, the steam space in the second portion of the primary water coolant circuit forms a pressurizing steam space.

5. A pressurized water cooled nuclear reactor as claimed in claim 1 wherein the pressurizer is integral with the pressure vessel.

6. An integral pressurized water cooled nuclear reactor comprising a pressure vessel, a reactor core, a primary water coolant circuit, at least one heat exchanger, a pressurizer and an inner vessel, the integral pressurized water nuclear reactor having a longitudinal axis, the inner vessel being positioned within and spaced from the pressure vessel, the primary water coolant circuit comprising a main portion and a second portion, the reactor core, the at least one heat exchanger and the main portion of the primary water coolant circuit being positioned within the inner vessel, the pressurizer and the second portion of the primary water coolant circuit being positioned in the space between the pressure vessel and the inner vessel, the primary water coolant circuit having a water level and a steam space, the steam space forming a pressurizing steam space, the inner vessel having a first region, the first region of the inner vessel having at least one aperture to interconnect the main portion of the primary water coolant circuit within the inner vessel with the second portion of the primary water coolant between the pressure vessel and the inner vessel to allow a flow of primary water coolant therebetween, the at least one aperture in the inner vessel being dimensioned, arranged and configured to prevent steam from the steam space of the pressurizer from entering the main portion of the primary water coolant circuit in the inner vessel if in operation the longitudinal axis of the integral pressurized water cooled nuclear reactor is displaced from a normal position in which the longitudinal axis of the integral pressurized water cooled nuclear reactor is substantially vertical and the aperture in the first region of the inner vessel is at an upper region of the inner vessel to one of two abnormal positions, in the first abnormal position the longitudinal axis of the integral pressurized water cooled nuclear reactor is disposed at an angle with respect to the vertical direction, in the second abnormal position the longitudinal axis of the integral pressurized water cooled nuclear reactor is substantially vertical but the inner vessel has been displaced such that the aperture in the inner vessel is at a lower region of the lower vessel whereby the inner vessel maintains primary water coolant around the reactor core.

7. An integral pressurized water cooled nuclear reactor as claimed in claim 6 wherein the inner vessel is arranged coaxially with the pressure vessel and the aperture in the inner vessel is arranged coaxially with the longitudinal axis of the integral pressurized water cooled nuclear reactor.

8. An integral pressurized water cooled nuclear reactor as claimed in claim 6 disposed in a ship.

9. An integral pressurized water cooled nuclear reactor as claimed in claim 1, wherein the pressurizer is separate from the pressure vessel.

* * * * *